(12) United States Patent
Alvarez et al.

(10) Patent No.: US 12,014,296 B2
(45) Date of Patent: Jun. 18, 2024

(54) TEST AND TRAINING DATA

(71) Applicant: Qbox Corp Ltd, Farnborough (GB)

(72) Inventors: Benoit Alvarez, Oxford (GB); Bryn Horsfield-Schonhut, Wokingham (GB)

(73) Assignee: Qbox Corp Ltd, England (GB)

( * ) Notice: Subject to any disclaimer, the term of this patent is extended or adjusted under 35 U.S.C. 154(b) by 671 days.

(21) Appl. No.: 17/049,426

(22) PCT Filed: Apr. 25, 2019

(86) PCT No.: PCT/EP2019/060611
§ 371 (c)(1),
(2) Date: Oct. 21, 2020

(87) PCT Pub. No.: WO2019/207042
PCT Pub. Date: Oct. 31, 2019

(65) Prior Publication Data
US 2021/0241038 A1    Aug. 5, 2021

(30) Foreign Application Priority Data

Apr. 25, 2018   (EP) .................................... 18169219

(51) Int. Cl.
*G06K 9/00*       (2022.01)
*G06F 18/21*      (2023.01)
(Continued)

(52) U.S. Cl.
CPC ......... *G06Q 10/04* (2013.01); *G06F 18/2115* (2023.01); *G06F 18/2148* (2023.01);
(Continued)

(58) Field of Classification Search
CPC .................................................. G06F 18/2115
See application file for complete search history.

(56) References Cited

U.S. PATENT DOCUMENTS 9,785,886 B1   10/2017   Andoni et al.
10,902,539 B2 *  1/2021   Rodriguez ............ G06T 1/0021
(Continued)

FOREIGN PATENT DOCUMENTS

EP        1 388 812        2/2004

OTHER PUBLICATIONS

European Examination Report for corresponding EP Application No. EP 19718752.9 dated Jan. 21, 2022, 7 pages.
(Continued)

*Primary Examiner* — Hadi Akhavannik
(74) *Attorney, Agent, or Firm* — Boon Intellectual Property Law, PLLC; Brian S. Boon

(57) ABSTRACT

A method, apparatus and computer-readable instructions are described including obtaining a plurality of sets of training and test data packages (wherein: each of the plurality of sets comprises test data and training data, wherein the test data comprises a subset of a first plurality of data items and the training data comprises a remainder of the first plurality of data items; each data item of the first plurality of data items is allocated as test data for only one of the plurality of sets of training and test data packages; and each data item comprises a classification identifier); receiving a new data item having a classification identifier; and adding the new data item to one of the plurality of sets of training and test data packages as test data and adding the new data item to the other of the plurality of sets of training and test data packages as training data, wherein the one of the plurality of sets of training and test data packages to which the new data item is added as test data is selected depending on the classification identifier of the new data item and the classification identifiers of the first plurality of data items.

15 Claims, 6 Drawing Sheets

(51) Int. Cl.
*G06F 18/2115* (2023.01)
*G06F 18/214* (2023.01)
*G06N 3/08* (2023.01)
*G06N 20/00* (2019.01)
*G06Q 10/04* (2023.01)

(52) U.S. Cl.
CPC ........... *G06F 18/2178* (2023.01); *G06N 3/08* (2013.01); *G06N 20/00* (2019.01)

(56) References Cited

U.S. PATENT DOCUMENTS

| | | | |
|---|---|---|---|
| 2016/0018795 A1* | 1/2016 | Sayyar-Rodsari | G06F 17/10 700/29 |
| 2016/0021512 A1* | 1/2016 | Krallman | G06Q 30/0261 455/456.3 |
| 2016/0171068 A1* | 6/2016 | Hardin | G06F 16/24565 707/610 |
| 2016/0307098 A1 | 10/2016 | Goel et al. | |
| 2018/0046926 A1 | 2/2018 | Achin et al. | |
| 2019/0311290 A1* | 10/2019 | Huang | G01R 31/317 |
| 2019/0311428 A1* | 10/2019 | Adjaoute | G06N 20/00 |
| 2019/0317079 A1* | 10/2019 | Trenholm | G01N 21/783 |

OTHER PUBLICATIONS

International Search Report and Written Opinion for corresponding PCT Application No. PCT/EP2019/060611, dated May 17, 2019, 16 pages.

Cho et al. "Evolution of Neural Network Training Set Through Addition of Virtual Samples," Proceedings of IEEE International Conference on Evolutionary Computation, May 20-22, 1996—4 pages.

* cited by examiner

TEST AND TRAINING DATA

PRIORITY CLAIM

The present application is national stage filing under 35 U.S.C. § 371 of Patent Cooperation Treaty Application Number PCT/EP2019/060611 having a filing date of Apr. 25, 2019, which claims priority to European Patent Application Number 18169219.5 filed Apr. 25, 2018. Applicant claims priority to and the benefit of each of such applications.

TECHNICAL FIELD

The present specification relates to test and training data, for example for use in testing and training models, such as neural network, machine-learned and/or artificial intelligence models.

BACKGROUND

The use of training data to train a model is known. Testing such a model with test data that does not form part of the training data is known. However, in situations where the quantity of training data is limited, reserving some potential training data for testing purposes can be undesirable.

SUMMARY

In a first aspect, this specification describes a method comprising: obtaining a plurality of sets of training and test data packages, wherein: each of the plurality of sets comprises test data and training data, wherein the test data comprises a subset of a first plurality of data items and the training data comprises a remainder of the first plurality of data items; each data item of the first plurality of data items is allocated as test data for only one of the plurality of sets of training and test data packages; and each data item comprises a classification identifier; receiving a new data item having a classification identifier; and adding the new data item to one of the plurality of sets of training and test data packages as test data and adding the new data item to the other of the plurality of sets of training and test data packages as training data, wherein the one of the plurality of sets of training and test data packages to which the new data item is added as test data is selected depending on the classification identifier of the new data item and the classification identifiers of the first plurality of data items. The classification identifier of a data item may, for example, correspond to an intended use of said data item.

Selecting said one of the plurality of sets of training and test data packages to which the new data item is added as test data may comprise identifying the set of training and test data packages of the plurality having test data having the fewest number of data items having a classification identifier in common with the classification identifier of the new data item.

Selecting said one of the plurality of sets of training and test data packages to which the new data item is added as test data may comprise identifying the set of training and test data packages of the plurality having test data having the fewest number of data items.

In one embodiment, selecting said one of the plurality of sets of training and test data packages to which the new data item is added as test data comprises: identifying one or more set(s) of training and test data packages having test data having the fewest number of data items having a classification identifier in common with the classification identifier of the new data item; and in the event that two or more of the sets of training and test data packages have test data having equal fewest data items having a classification identifier in common with the classification identifier of the new data item, identifying the set of training and test data packages of said two or more of the sets of training and test data packages having test data having the fewest number of data items. Further, in the event that two or more of the sets of training and test data packages have test data having equal fewest number of data items, selecting said one of the plurality of sets of training and test data packages arbitrarily or randomly (e.g. an arbitrary or random selection of the training and test data packages having test data having equal fewest number of data items).

Selecting said one of the plurality of sets of training and test data packages may comprise an arbitrary or random selection.

The method may further comprise, for any of the first plurality of data items that is deleted from said first plurality of data items, deleting said data item from each of the plurality of sets of training and test data packages. Further, in the event the first plurality of data items is modified by deleting one or more first old data items and adding one or more second new data items, the method may comprise deleting said first old data item(s) from each of the plurality of sets of training and test data packages before adding the second new data item(s) to any of the plurality of sets of training and test data packages.

In one embodiment, obtaining the plurality of sets of training and test data packages comprises generating said plurality of sets of training and test data packages. For example, generating each training and test data package of the plurality may comprise randomly selecting said subset of test data items from the plurality of data items for each of the plurality of sets of training and test data packages, subject to defined rules.

By randomly selecting test data from the wider data set, a plurality of sets of data may be obtained from a relatively small data set. The said defined rules may require that data items are distributed amongst the test data of the plurality of sets of test and training data such that the number of data items having each classification identifier is evenly distributed amongst the plurality of sets of test and training data (e.g. in so far as an even distribution is possible).

In one example embodiment, obtaining the plurality of sets of training and test data packages comprises receiving or retrieving said plurality of sets of training and test data packages.

The said training data may comprise training data for a model (such as a neural network/machine-learned/artificial intelligence model). Alternatively, or in addition, the said test data may comprise test data for a model (such as a neural network/15 machine-learned/artificial intelligence model).

In a second aspect, this specification describes a method comprising: generating a plurality of sets of training and test data packages using a method as described above with reference to the first aspect (e.g. by obtaining a plurality of sets of training and test data packages and adding one or more new data items thereto); training a model using training data of a selected one of said training and test data packages; and generating a performance measurement for the trained model by applying the test data of the selected training and test data packages to the trained model. The model may, for example, be a neural network model, a machine-learned model, an artificial intelligence model or some similar model.

In a third aspect, this specification describes an apparatus configured to carry out any method as described above with reference to the first or second aspects.

In a fourth aspect, this specification describes computer-readable instructions which, when executed by computing apparatus, cause the computing apparatus to perform any method as described with reference to the first or second aspects.

In a fifth aspect, this specification describes an apparatus comprising: means for obtaining a plurality of sets of training and test data packages, wherein: each of the plurality of sets comprises test data and training data, wherein the test data comprises a subset of a first plurality of data items and the training data comprises a remainder of the first plurality of data items; each data item of the first plurality of data items is allocated as test data for only one of the plurality of sets of training and test data packages; and each data item comprises a classification identifier; means for receiving a new data item having a classification identifier; and means for adding the new data item to one of the plurality of sets of training and test data packages as test data and adding the new data item to the other of the plurality of sets of training and test data packages as training data, wherein the one of the plurality of sets of training and test data packages to which the new data item is added as test data is selected depending on the classification identifier of the new data item and the classification identifiers of the first plurality of data items. The classification identifier of a data item may, for example, correspond to an intended use of said data item. In at least some embodiments, the means may comprise: at least one processor; and at least one memory including computer program code configured to, with the at least one processor, cause the performance of the apparatus.

In a sixth aspect, this specification describes a computer readable medium comprising program instructions for causing an apparatus to perform at least the following: obtaining a plurality of sets of training and test data packages, wherein: each of the plurality of sets comprises test data and training data, wherein the test data comprises a subset of a first plurality of data items and the training data comprises a remainder of the first plurality of data items; each data item of the first plurality of data items is allocated as test data for only one of the plurality of sets of training and test data packages; and each data item comprises a classification identifier; receiving a new data item having a classification identifier; and adding the new data item to one of the plurality of sets of training and test data packages as test data and adding the new data item to the other of the plurality of sets of training and test data packages as training data, wherein the one of the plurality of sets of training and test data packages to which the new data item is added as test data is selected depending on the classification identifier of the new data item and the classification identifiers of the first plurality of data items. The classification identifier of a data item may, for example, correspond to an intended use of said data item.

In an seventh aspect, this specification describes a non-transitory computer-readable medium comprising program instructions stored thereon for performing at least the following: obtaining a plurality of sets of training and test data packages, wherein: each of the plurality of sets comprises test data and training data, wherein the test data comprises a subset of a first plurality of data items and the training data comprises a remainder of the first plurality of data items; each data item of the first plurality of data items is allocated as test data for only one of the plurality of sets of training and test data packages; and each data item comprises a classification identifier; receiving a new data item having a classification identifier; and adding the new data item to one of the plurality of sets of training and test data packages as test data and adding the new data item to the other of the plurality of sets of training and test data packages as training data, wherein the one of the plurality of sets of training and test data packages to which the new data item is added as test data is selected depending on the classification identifier of the new data item and the classification identifiers of the first plurality of data items. The classification identifier of a data item may, for example, correspond to an intended use of said data item.

In an eighth aspect, this specification describes an apparatus comprising: at least one processor; and at least one memory including computer program code which, when executed by the at least one processor, causes the apparatus to: obtain a plurality of sets of training and test data packages (wherein: each of the plurality of sets comprises test data and training data, wherein the test data comprises a subset of a first plurality of data items and the training data comprises a remainder of the first plurality of data items; each data item of the first plurality of data items is allocated as test data for only one of the plurality of sets of training and test data packages; and each data item comprises a classification identifier); receive a new data item having a classification identifier; and add the new data item to one of the plurality of sets of training and test data packages as test data and add the new data item to the other of the plurality of sets of training and test data packages as training data, wherein the one of the plurality of sets of training and test data packages to which the new data item is added as test data is selected depending on the classification identifier of the new data item and the classification identifiers of the first plurality of data items.

BRIEF DESCRIPTION OF THE DRAWINGS

Example embodiments will now be described, by way of non-limiting examples, with reference to the following schematic drawings, in which.

DETAILED DESCRIPTION

Figure 1:
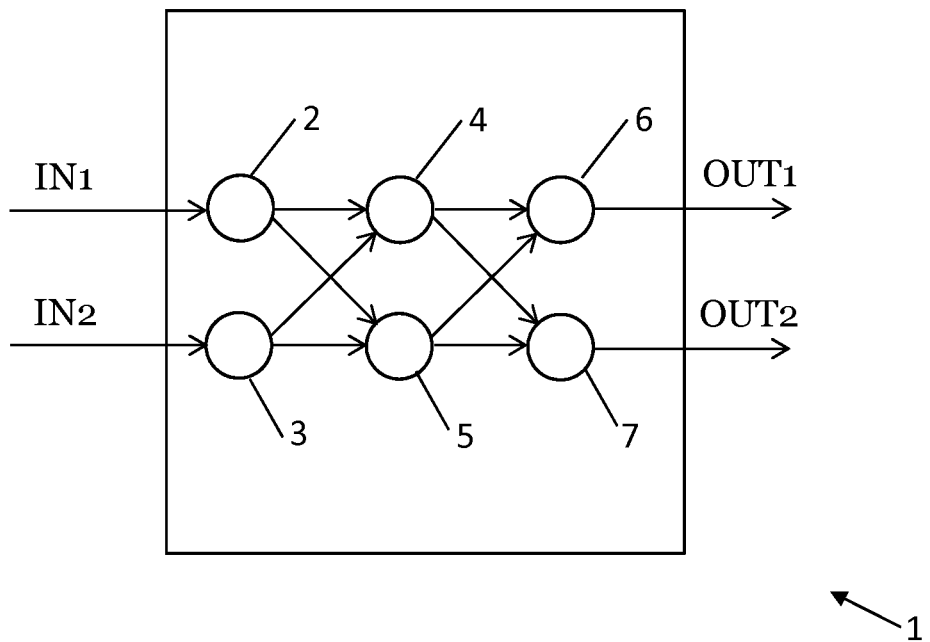
FIG. 1 shows an example model.

FIG. 1 shows an example model indicated generally by the reference numeral 1. The model 1 may be a neural network, artificial intelligence or machine-learned model comprising a plurality of nodes. By way of example only, the model 1 comprises a first node 2, a second node 3, third node 4, a fourth node 5, a fifth node 6 and a sixth node 7. The nodes are organised into layers, with the first and second nodes 2, 3 forming an input layer coupled to the first input IN1 and second input IN2 respectively. The third and fourth nodes 4, 5 form a hidden layer. The fifth and sixth nodes 6, 7 form an output layer and are coupled to the first output OUT1 and second output OUT2 respectively.

The model 1 has a number of parameters, many of which can be trained such that the model 1 can be trained to perform many different tasks. The nodes 2 to 7 may have a number of different functions. The nodes 2 to 7 may each be connected to other nodes of the model by trainable weights. The process by which the parameters are set and/or optimised is referred to as training the model 1.

The neural network model 1 is provided by way of example only. Any of the parameters of the model may be changed in any particular embodiment. Such parameters include: the number of inputs, the number of outputs, the number of nodes, the number of layers of nodes, the connections between nodes etc. For example, in many example embodiments, multiple hidden layers may be provided. Moreover, the use of a neural network model is not essential to all example embodiments.

Figure 2:
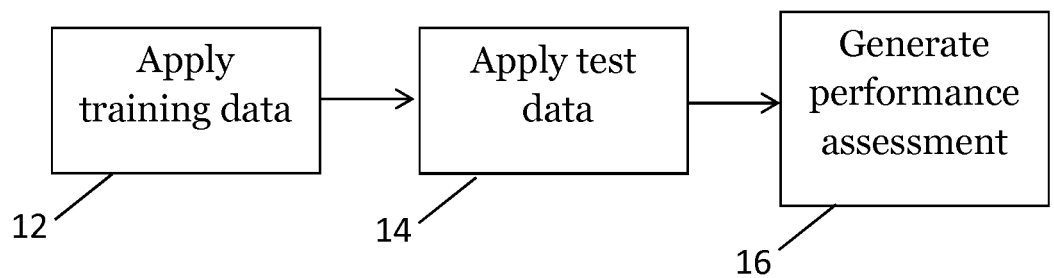
FIG. 2 is a flow chart showing an algorithm of an example use of the model of FIG. 1.

FIG. 2 is a flow chart showing an algorithm, indicated generally by the reference numeral 10, of an example use of the model 1 of FIG. 1. The algorithm 10 starts at step 12 where training data is applied to the model. The training data may be applied, for example, at the inputs IN1 and IN2 of the model 1. As part of the training process, the inputs and outputs are monitored and used to adjust the parameters of the model 1.

Next, at step 14 of the algorithm 10, test data is applied to the model. The test data may be applied, for example, at the inputs IN1 and IN2 of the model 1 and output at the outputs OUT1 and OUT2 of the model 1. The output generated by the model in response to the applied test data may be verified, for example against an expected or desired output.

At step 16 of the algorithm 10, a performance assessment may be generated based on the extent to which the model provides expected or desired outputs in response to a range of inputs.

The test data applied in the step 14 may be different to the training data applied in the step 12. This may be achieved by reserving some potential training data for testing purposes. This may be undesirable if, for example, the quantity of training data available is limited.

Figure 3:
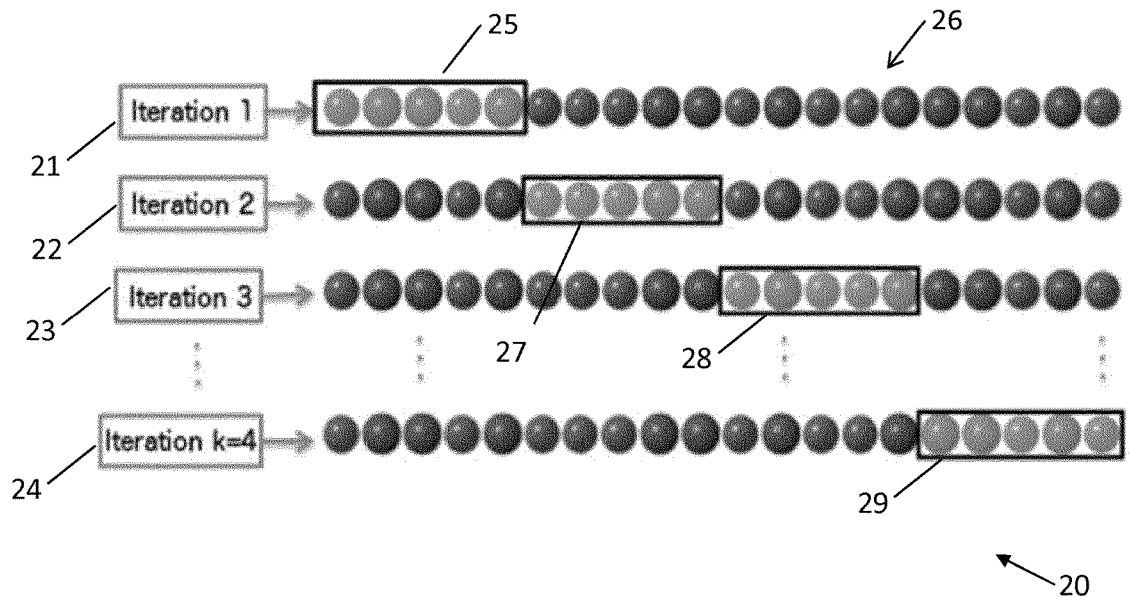
FIG. 3 is a data structure in accordance with an example embodiment.

FIG. 3 is a data structure, indicated generally by the reference numeral 20, in accordance with an example embodiment. The data structure 20 comprises a plurality of sets of training and test data packages. The plurality of sets of training and test data packages includes a first set 21 (labelled "Iteration 1" in FIG. 3), a second set 22 (labelled "Iteration 2"), a third set 23 (labelled "Iteration 3") and a fourth set 24 (labelled "Iteration 4").

Each of the sets of data 21 to 24 includes a plurality of data items (indicated by the circles in FIG. 3). Furthermore, each of the sets of data 21 to 24 may include the same data items, with the division of those data items between test data and training data being different in the different iterations. Thus, the first set 21 includes a plurality of data items that form test data 25. Similarly, the second set 22 includes test data 27, the third set 23 includes test data 28 and the fourth set 24 includes test data 29. In each of those sets, the data not included in the test data forms the training data for that set of training and test data. Thus, for example, the first set includes training data 26.

As can be seen in FIG. 3, each data item of the plurality is allocated as test data for only one of the plurality of training and test data packages. Indeed, in the example data structure 20, each data item is allocated as test data for one (and only one) of the plurality of training and test data packages.

Figure 4:
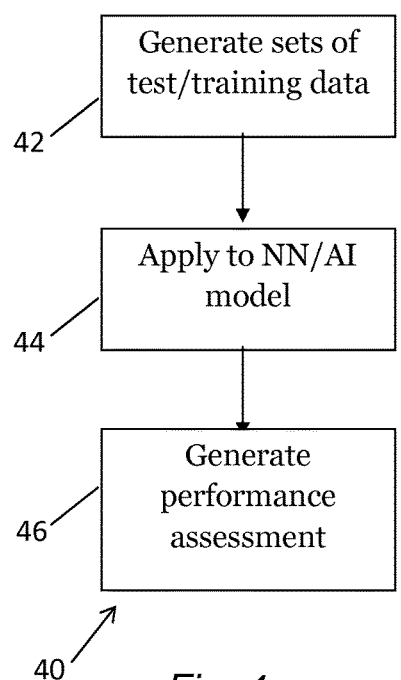
FIGS. 4 to 6 are flow charts showing algorithms in accordance with example embodiments.

FIG. 4 is a flow chart showing an algorithm, indicated generally by the reference numeral 40, in accordance with an example embodiment. The algorithm 40 starts at step 42 where sets of training and test data are generated. Thus, for example, the training and test data packages 21 to 24 described above may be generated here. The data selected for the test data 25, 27, 28 and 29 for each of the sets of data may be selected randomly (subject to the restriction that each data items can only be test data for one of the sets of data).

Next, at step 44, a model (such as a neural network, machine learned or artificial intelligence model) is trained using training data of one or more of the training and test data packages. Thus, for example, the training data 26 may be applied to the model.

At step 46, test data is used to obtain a measurement of the performance of the trained (or partially trained) model. Thus, for example, in the event that the training data 26 is applied to the model, the test data 25 (which does not form part of the training data 26) may be used to measure the performance of the model.

The performance assessment may be a composite assessment based on applying several (perhaps all) of the sets of test data. Thus, for example, a neural network, machine-learned or artificial intelligence model may be trained and tested as follows:

The model may be trained using the training data 26 of the first set of training and test data packages 21 and the tested using the test data 25 of the first set of training and test data packages.

The model may then be trained using the training data of the second set of training and test data packages 22 and the tested using the test data 27 of the second set of training and test data packages.

The model may then be trained using the training data of the third set of training and test data packages 23 and the tested using the test data 28 of the third set of training and test data packages.

Finally, the model may be trained using the training data of the fourth set of training and test data packages 24 and the tested using the test data 29 of the third set of training and test data packages.

Once the model has been trained using all of the iterations of the training data, a composite performance assessment score may be generated in the step 46 such that the performance of the trained model can be evaluated. The composite performance measurement may be generated in one of many ways. For example, a performance measurement may be generated after all of the iterations have been completed, on the basis of data from all of those iterations.

The skilled person will be aware of many methodologies for generating the performance measurement described above. By way of example, an Fi score may be generated.

Consider, for example, a neural network, machine-learned or artificial intelligence model that is being used as part of a natural language processing module. Computer systems have difficulty in interacting with natural (i.e. human) languages. Artificial intelligence, machine learning and neural networks can be used to train such systems to perform better.

The training of a natural language processing module may involve generating a large number of questions that can be used to train the module. A limitation of such training algorithms is that it can be difficult to develop large sets of training data (in particular generating large sets of training data for each of a number of classifications).

During the training of neural network, machine-learned or artificial intelligence models, it is possible that further data items may be generated. In the context of a natural language processor, for example, these may include further questions for use in training and/or testing the model.

Figure 5:
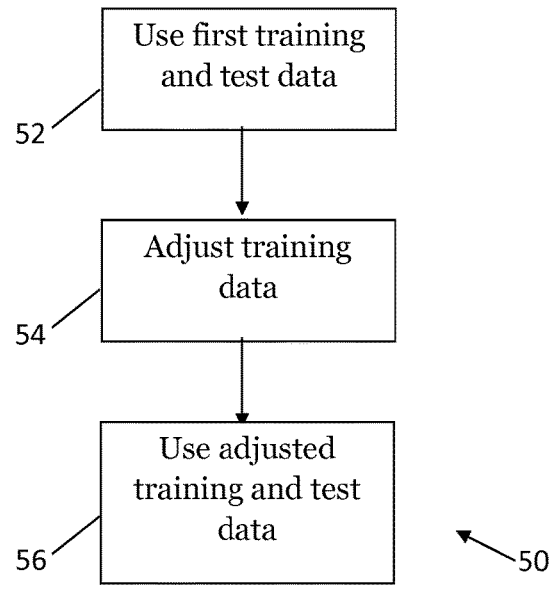

FIG. 5 is a flow chart showing an algorithm, indicated generally by the reference numeral 50, in accordance with an example embodiment. The algorithm 50 starts at step 52, wherein first training and test data are used to generate first a performance assessment. The step 52 may, for example, make use of the algorithm 40 described above to generate sets of training and test data packages, train the model using the training data and generate a performance assessment.

Next, at step 54, the training data is adjusted. This may, for example, be because the initial training and testing indicates a problem with the neural network, machine-learned or artificial intelligence model (e.g. poor performance) that the additional training data seeks to correct. For example, one or more further data items may be provided in the step 54. Alternatively, or in addition, one or more data items may be deleted.

The adjusted training and test data is used in step 56 of the algorithm 50. The step 56 may, for example, make use of the algorithm 40 described above to generate sets of training and test data packages, train the model using the training data and generate a performance assessment.

The algorithm 50 may be used in an attempt to determine the impact that the adjustment of the training data in step 54 has had on the quality of a model. For example, has the including of additional data items made the model better, worse, or had no impact at all? In particular, if a problem with a model has been identified (as suggested above), have the changes made addressed the problem? Further, have any other problems been caused by the changes made?

The inventors have realised that due to random nature in which the test and training data is generated in each instance of the step 42, a difference between the performance assessments generated in step 52 and step 56 may be due to a different splitting of the test and training data, rather than to adjustments made to the test and training data. This is particularly true if the number of data items in each of the sets of training and test data packages is relatively small.

Figure 6:
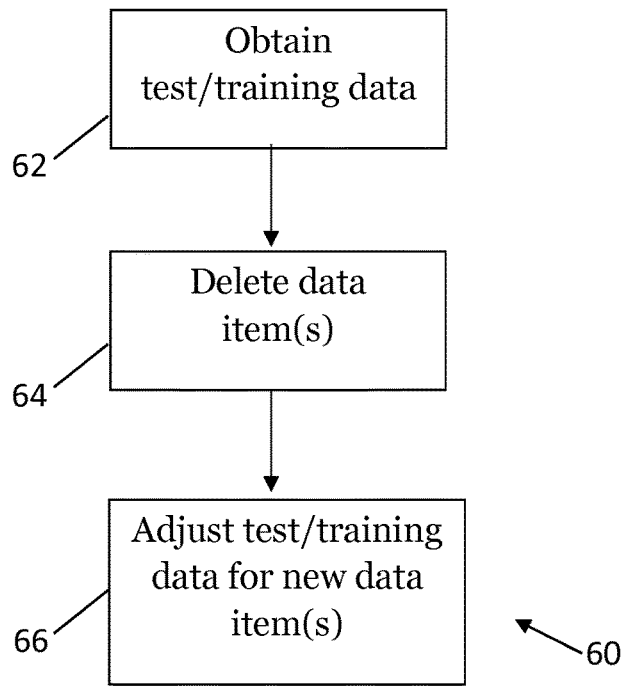

FIG. 6 is a flow chart showing an algorithm, indicated generally by the reference numeral 60, in accordance with an example embodiment.

The algorithm 60 starts at step 62, wherein sets of training and test data packages are obtained. Step 62 may be implemented by generating sets of training and test data packages (as described above, for example, with reference to step 42 of the algorithm 40). Alternatively, the step 62 may be implemented by receiving training and test data and/or retrieving previously stored data (or receiving/retrieving previously seeded data that can be regenerated).

As in the algorithm 50 described above, the training and test data is adjusted. In the algorithm 60, the adjustment of the training and test data may involve deleting one or more data items (step 64 of the algorithm 60) and/or adding one or more data items (step 66 of the algorithm 60).

Step 64 of the algorithm 60 is carried out after the sets of training and test data have been generated. Accordingly, the step 64 can be implemented simply by deleting the relevant data item(s) from each set of training and test data.

As described further below, the step 66 is implemented accordingly to a set of rules intended to ensure that the impact of the changes made to the training and test data on the measured performance of the model is due to the content of the data items rather than the organisation of those data items within the sets of training and test data packages.

Figure 7:
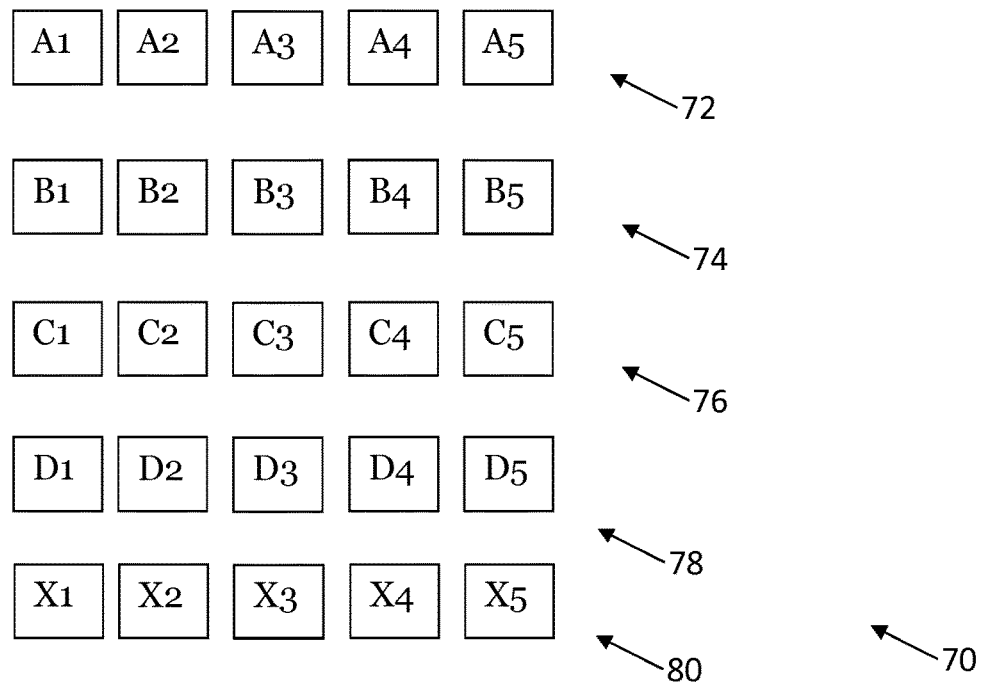
FIG. 7 shows test and training data in accordance with an example embodiment.

FIG. 7 shows test and training data, indicated generally by the reference numeral 70, in accordance with an example embodiment. The test and training data 70 includes data have different classification identifiers. As shown in FIG. 7, the data 70 includes five data items (A1 to A5) indicated generally by the reference numeral 72 that each have a classification A, five data items (B1 to B5) indicated generally by the reference numeral 74 that each have a classification B, five data items (C1 to C5) indicated generally by the reference numeral 76 that each have a classification C, five data items (D1 to D5) indicated generally by the reference numeral 78 that each have a classification D and five data items (X1 to X5) indicated generally by the reference numeral 80 that each have a classification X.

The classification identifiers may take many forms. For example, in the context of natural language processing, the classification identifiers may identify classes of questions to which a data item relates (e.g. questions concerning products and/or services provided by a company, contact details for the company and job vacancies at the company). In the context of image processing, the classification identifies may take the form of categories of images (such as images of cats, images of dogs, images of humans etc.).

Some other examples of classification identifiers are listed below. Others will be apparent to those skilled in the art:
  Classification of customers into categories so they can be targeted with marketing appropriate to the category;
  Classification of financial transactions (e.g. into "fraudulent", "needs review", "not fraudulent" etc.);
  Classification of messages received from a computer system according to whether they show errors or not;
  Classification of galaxies into different types.

Of course, the classifications of the data 70 are provided by way of example only. Any number of classifications could be provided and any number of data items could be provided within each classification (and the number may differ between classifications).

Figure 8:
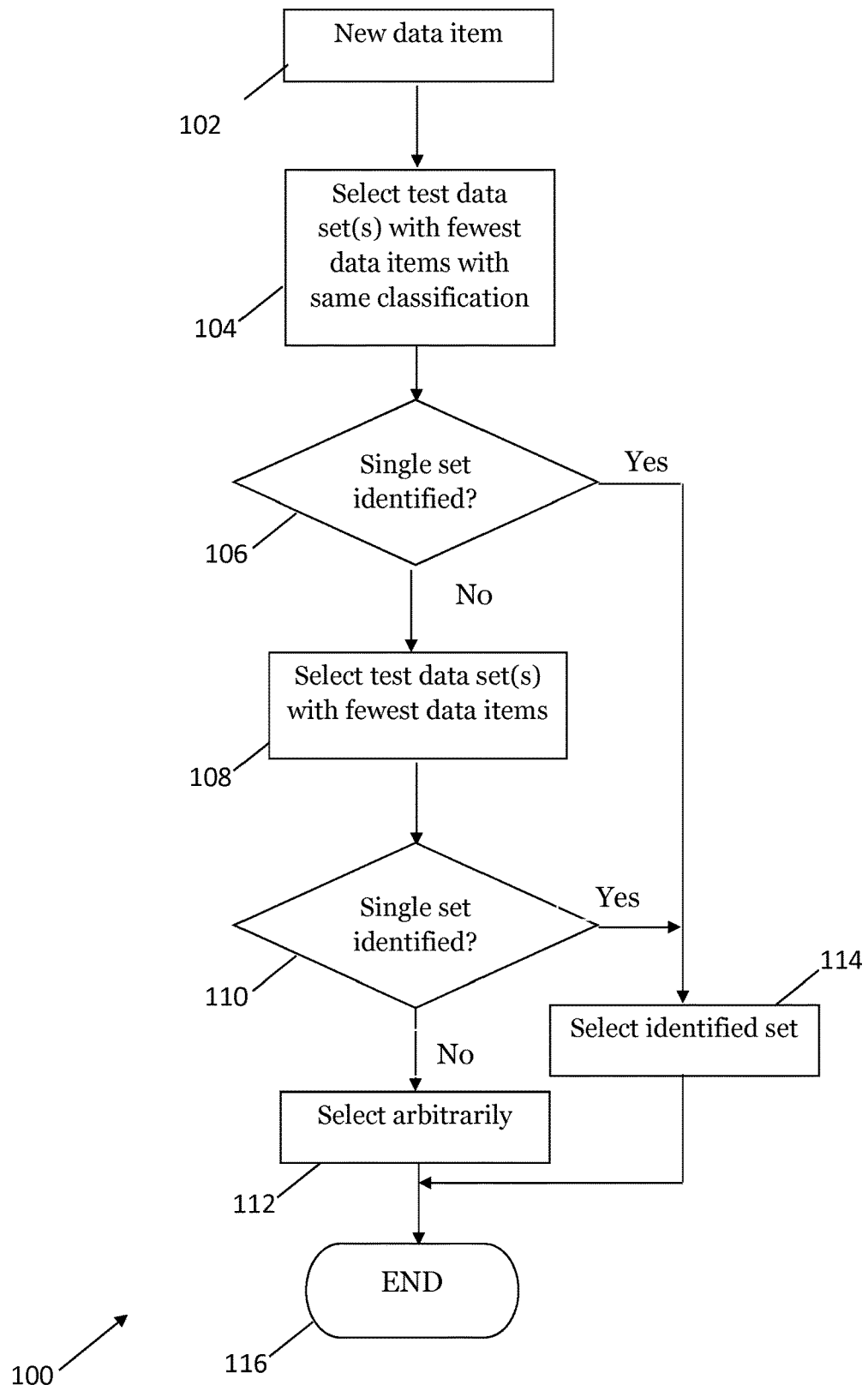
FIG. 8 is a flow chart showing an algorithm in accordance with an example embodiment.

FIG. 8 is a flow chart showing an algorithm, indicated generally by the reference numeral 100, in accordance with an example embodiment.

The algorithm 100 starts at step 102, where a new data item is provided. The training and test data is to be modified to incorporate the new data item (as discussed above with reference to step 66 of the algorithm 60). The new data item is provided together with a classification identifier.

At step 104, the test data set(s) with the fewest data items having the same classification identifier as the new data item are identified. Step 106 determines whether a single test data set is identified in step 104. If so, the algorithm 100 moves to step 114, where the identified single data set is selected; otherwise the algorithm moves to step 108.

At step 108, the test data set(s) with the fewest data items are identified. The step 108 may be restricted to the data sets identified in step 106. Step 110 determines whether a single test data set is identified in step 104. If so, the algorithm 100 moves to step 114, where the identified single data set is selected; otherwise the algorithm moves to step 112.

At step 112, an arbitrary (e.g. random) selection is made amongst the data sets. The step 112 may be restricted to making a selection amongst the data sets identified at step 108.

Thus, a single data set is selected at either step 112 or step 114 of the algorithm. With a data set selected, the algorithm 100 then terminates at step 116.

The algorithm 100 is provided by way of example only; many variants to that algorithm are possible. For example, some of the steps of the algorithm may be omitted and/or combined.

The algorithm 100 describes selecting test data set(s) with fewest data items of the same classification (step 104), selecting test data set(s) with fewest data items (step 108) and making arbitrary selections. Any one or more of these steps may be omitted (for example, step 108 and the associated step 110 may be omitted). Alternatively, or in addition, other steps may be provided. For example, one or more set(s) may be selected according to some function of the data item to be added (such as a hash function). Moreover, at least some of the steps of the algorithm 100 may be implemented in a different order.

FIGS. 9 to 12 shows data structures demonstrating example uses of the algorithm 100 described above.

Figure 9:
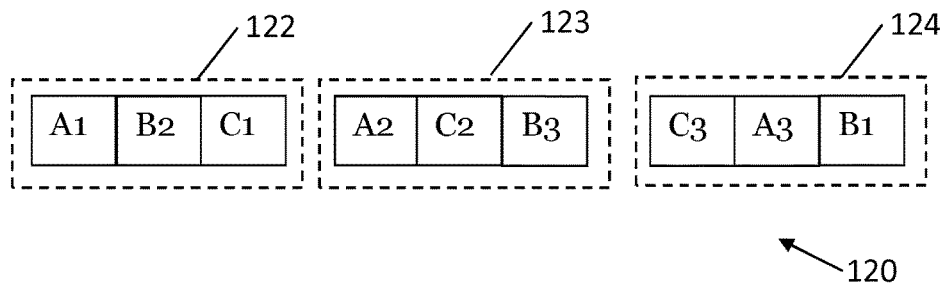
FIGS. 9 to 12 are data structures in accordance with example embodiments.

FIG. 9 is a data structure, indicated generally by the reference numeral 120, in accordance with an example embodiment. The data structure 120 includes nine data items, labelled A1, A2, A3, B1, B2, B3, C1, C2 and C3. The data items A1, A2 and A3 share the classification identifier A, the data items B1, B2 and B3 share the classification identifier B and the data items C1, C2 and C3 share the classification identifier C.

The data items within the data structure are used to generate a plurality of sets of training and test data packages. In order to do so, the data items are randomly sorted into test and training data groups, subject, in the specific example of FIG. 9, that the data items are distributed such that the number of data items having each classification identifier is evenly distributed across the groups.

Thus, as shown in FIG. 9, the data set comprises a first group 122 comprising the data items A1, B2 and C1, a second group 123 comprising the data items A2, C2 and B3, and a third group 124 comprising the data items C3, A3 and B1. The data structure 120 may, for example, be generated by an implementation of one of the steps 42 or 62 described above.

The data set 120 is used to generate a plurality of sets of training and test data packages, as follows. The first set of training and test data packages allocates the first group 122 as test data and the other groups as training data. The second set of training and test data packages allocates the second group 123 as test data and the other groups as training data. The third set of training and test data packages allocates the third group 124 as test data and the other groups as training data.

Thus:
The first set of training and test data packages comprises the test data {A1, B2, C1} and the training data {A2, C2, B3, C3, A3, B1}.
The second set of training and test data packages comprises the test data {A2, C2, B3} and the training data {A1, B2, C1, C3, A3, B1}.
The third set of training and test data packages comprises the test data {C3, A3, B1} and the training data {A1, B2, C1, A2, C2, B3,}.

Assume now that two new data items A4 and A5 (having the classification identifier A) are received in an instance of the step 102 of the algorithm 100. Those two data items are considered in turn (with A4 being considered first, followed by A5).

At step 104 of the algorithm 100, the test data set(s) with the fewest data items with the same classification as the new data item are identified. The new data item has a classification identifier A. The first, second and third groups 122 to 124 each have one data item having the classification identifier A, so all groups are selected. The step 106 is therefore answered in the negative. Similarly, the first, second and third groups 122 to 124 each have three data items in total, so all groups are again selected at step 108. The step 110 is therefore answered in the negative and an arbitrary selection is made (step 112).

By way of example, the third group 124 may be arbitrarily selected such that the data item A4 is added to the third group.

Next, the data item A5 is considered. At step 104 of the algorithm 100, the newly updated test data sets are considered. Now, the first and second groups 122 and 123 have one data item having the classification A and the third group 124 has two data items having the classification A. Thus, the step 106 is answered in the negative and the algorithm 100 moves to step 108.

At step 108, the first and second groups 122 and 123 are considered and the test data set(s) with fewest data items is selected. The first and second groups 122 and 123 both have three data items. The step 110 is therefore answered in the negative and an arbitrary selection is made (step 112).

By way of example, the first group 122 may be arbitrarily selected (from the first group 122 and the second group 123) such that the data item A5 is added to the first group.

Figure 10:
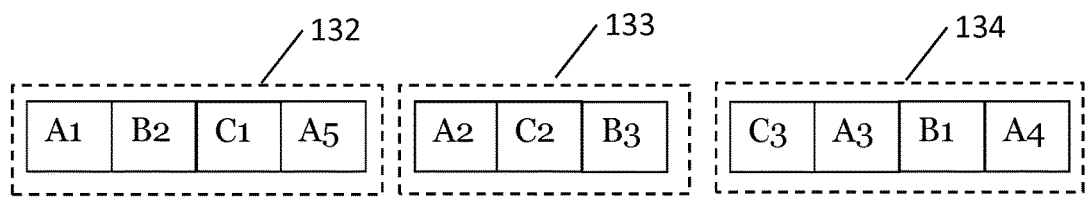

FIG. 10 is a data structure, indicated generally by the reference numeral 130, in accordance with an example embodiment, including the new data items A4 and A5.

As shown in FIG. 10, the data structure 130 comprises a first group 132 comprising the data items A1, B2, C1 and A5, a second group 133 comprising the data items A2, C2 and B3, and a third group 134 comprising the data items C3, A3, B1 and A4.

Assume now that the data items A1 and C1 are deleted (for example, in an instance of the step 64 of the algorithm 60). Those data items are both deleted from the first group 132 of the data structure 130.

Figure 11:
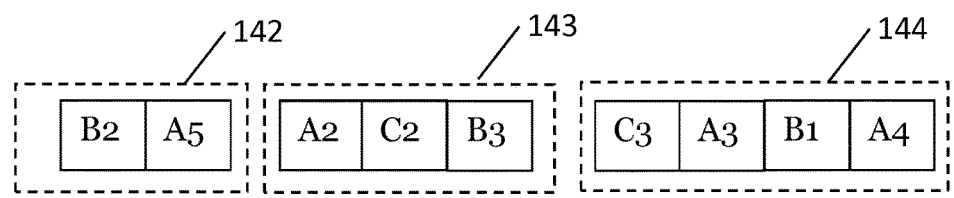

FIG. 11 is a data structure, indicated generally by the reference numeral 140, in accordance with an example embodiment, following the deletion of the data items A1 and C1. As shown in FIG. 11, the data structure 140 comprises a first group 142 comprising the data items B2 and A5, a second group 143 comprising the data items A2, C2 and B3, and a third group 144 comprising the data items C3, A3, B1 and A4.

Assume now that three new data items A6, B4 and C4 (having the classification identifiers A, B and C respectively) are received in an instance of the step 102 of the algorithm 100. Those three data items are considered in turn (with A6 being considered first, followed by B4, and finally C4).

At step 104 of the algorithm 100, the test data set(s) with the fewest data items with the same classification as the new data item are identified. The new data item (A6) has a classification identifier A. The first and second groups 142 and 143 have one data item having the classification identifier A, and the third group 144 has two data items having the classification A. Thus, the step 106 is answered in the negative and the algorithm 100 moves to step 108.

At step 108, the first and second groups 142 and 143 are considered and the test data set(s) with fewest data items is selected. This first group 142 has two data items and the second group 143 has three data items. At step 110, it is determined that a single set of test data (the first group 142) has been identified, so that group is selected at step 114 such that the new data item A6 is added to the first group 142.

Next, the data item B4 is considered. At step 104 of the algorithm 100, the newly updated test data sets are considered. The first, second and third groups 142 to 144 each have one data item having the classification B. Thus, the step 104 is answered in the negative and the algorithm 100 moves to step 108.

At step 108, the first, second and third groups 142 to 144 are considered and the test data set(s) with the fewest data items is selected. The first and second groups have three data items and the third group has four data items. The step 110 is therefore answered in the negative and an arbitrary selection is made (step 112).

By way of example, the second group 143 may be arbitrarily selected so that group is selected at step 114 such that the new data item B4 is added to the second group 143.

Finally, the data item C4 is considered. At step 104 of the algorithm 100, the newly updated test data sets are considered. The second and third groups 143 and 144 both have one data item having the classification C. The first group 142 has no data items having the classification C. Thus, in the step 104 it is determined that a single set of test data (the first group 142) has been identified, so that group is selected at step 114 such that the new data item C4 is added to the first group 142.

Figure 12:
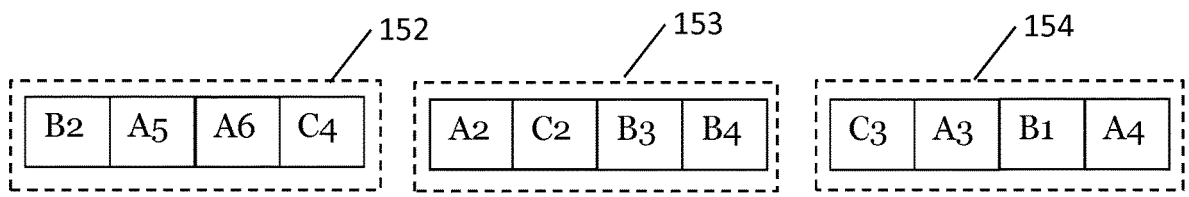

FIG. 12 is a data structure, indicated generally by the reference numeral 150, in accordance with an example embodiment, including the new data items A6, B4 and C4.

As shown in FIG. 12, the data structure 150 comprises a first group 152 comprising the data items B2, A5, A6 and C4, a second group 153 comprising the data items A2, C2, B3 and B4, and a third group 154 comprising the data items C3, A3, B1 and A4.

As will be clear from the description above, the principles described herein may be useful for developers of neutral network, machine-learned, artificial intelligence or similar models. If a developer makes an update to a model, or an improvement to address a previously identified flaw, then they would like to be able to verify the performance of the model after the change has been made, or to confirm whether an improvement has been made and/or whether another issues or problems have been created.

As described above, the inherent randomness of some known solutions means that it is not always possible for a developer to know that any changes in performance assessments are caused by changes they have made to the model, rather than the inherent variance in the testing process. The principles described herein seek to increase the likelihood that any changes in performance assessments are caused by model changes.

The principles described herein are particularly useful for system having data sets having small numbers of data items with particular classification identifiers (e.g. fewer than 100). The effect of the random variations described above is reduced as the number of data items having particular classification identifiers is increased. However, it is not always possible (or efficient) to create a model with very large numbers of data items in each classification.

Figure 13:
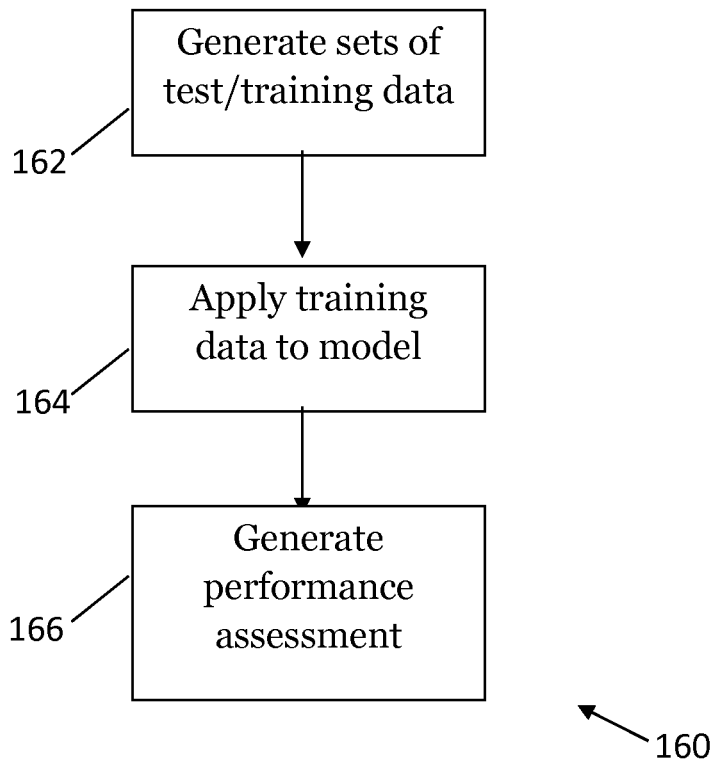
FIG. 13 is a flow chart showing an algorithm in accordance with an example embodiment.

FIG. 13 is a flow chart showing an algorithm, indicated generally by the reference numeral 160, in accordance with an example embodiment. The algorithm 160 starts at step 162 where a plurality of sets of training and test data are generated (for example, as described above with reference to FIGS. 6 to 12).

Next, at step 164, a model (such as a neural network, machine learned or artificial intelligence model) is trained using training data of a selected one of the training and test data packages.

At step 166, test data is used to obtain a measurement of the performance of the trained (or partially trained) model. Thus, for example, in the event that the training data 152 and 153 are applied to the model, the test data 154 (which does not form part of the training data) may be used to measure the performance of the model.

The principles described herein can be used in the training and testing of a variety of models, such as neural network, machine-learned and/or artificial intelligence models. Such models may be trained using a collection of sample data. A model developer or user may want to be able to compare the performance of a modified version of model with a previous version. As discussed above, this can be particularly problematic if the number of training examples per class is low. To illustrate, the following are example applications of the principles described herein.

An image processing application may be written to identify a type of image. For example, images of birds may be provided and the image processing application used to determine the species of bird. In the event that an application developer modifies the application to allow it to recognise another species of bird, a test may be desired to make sure that the application has not got any worse at recognising the species of bird that it had already been trained to recognise. Similarly, in the event that additional images of a particular specifies of bird become available, the model may be trained using data including the new images and a new performance assessment generated.

A natural language processing (NLP) model may be developed that is intended to classify text input into a number of categories so that a chatbot (or a similar algorithm) can generate a response to the text input. The model may be trained using a collection of sample pieces of text and the categories that those samples belong to. A developer may want to change the model to cover a new topic area. Alternatively, or in addition, the developer may add new training samples. The principles described herein enable the developer to compare the performance of the modified version to the performance of the original version of the model.

An estate agent may develop an artificial intelligence or machine-learned algorithm to estimate the prices of houses. The model may be trained with a collection of characteristics of houses (e.g. the number of bedrooms, location, age of property etc.) and their associated prices. Assume that the agent has just added some new training data to the model based on recent sales data. The principles described herein enable the agent to evaluate the impact of the new data of the performance of the model.

Of course, the examples described above are provide by way of example only. The skilled person will be aware of many other example applications of the principles described herein.

Figure 14:
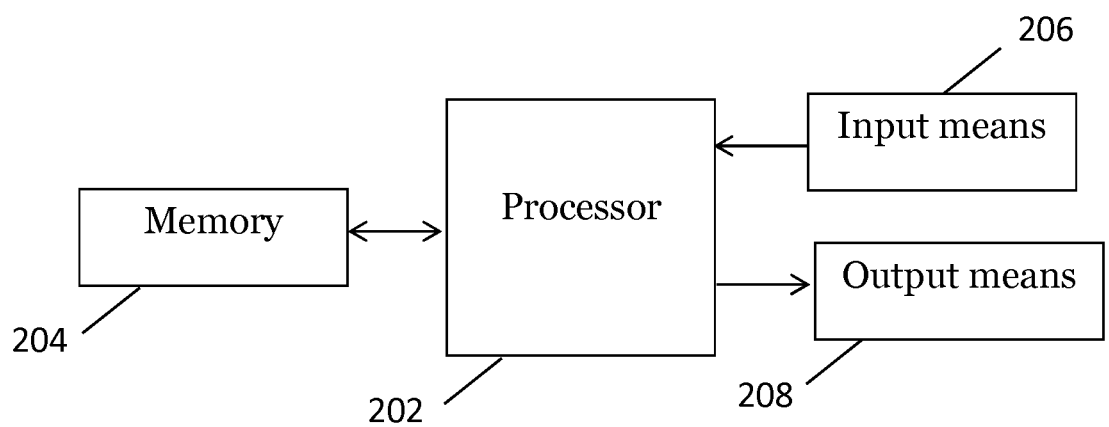
FIG. 14 is a block diagram of a system in accordance with an example embodiment.

For completeness, FIG. 14 is a schematic diagram of a system, indicated generally by the reference numeral 200, that may be used in example implementations of the principles described herein. The system 200 comprises a processor 202, a memory 204 (for example, including RAM and/or ROM), input means 206 and output means 208. The processor 202 is in communication with each of the other components in the system 200 in order to control operation thereof. The processor 202 may take any suitable form, such as a microcontroller, plural microcontrollers, a processor, or plural processors.

The memory 204 may include a non-volatile memory, a hard disk drive (HDD) or a solid state drive (SSD) and may, for example, store an operating system and/or one or more software applications. The operating system may contain code which, when executed by the processor, implements aspects of the algorithms described herein.

The input means 206 and the output means 208 may take many different forms and may be provided, for example, to allow a user (such as a model developer) to interact with the system 200.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 4, 5, 6, 8 and 13 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method comprising:
   obtaining a plurality of sets of training and test data packages, wherein:
      each of the plurality of sets comprises test data and training data, wherein the test data comprises a subset of a first plurality of data items and the training data comprises a remainder of the first plurality of data items;
      each data item of the first plurality of data items is allocated as test data for only one of the plurality of sets of training and test data packages; and
      each data item comprises a classification identifier;
   receiving a new data item having a classification identifier; and
   adding the new data item to one of the plurality of sets of training and test data packages as test data and adding the new data item to the other of the plurality of sets of training and test data packages as training data, wherein the one of the plurality of sets of training and test data packages to which the new data item is added as test data is selected depending on the classification identifier of the new data item and the classification identifiers of the first plurality of data items, wherein selecting said one of the plurality of sets of training and test data packages to which the new data item is added as test data comprises:
      identifying one or more set(s) of training and test data packages having test data having the fewest number of data items having a classification identifier in common with the classification identifier of the new data item; and
      in the event that two or more of the sets of training and test data packages have test data having equal fewest data items having a classification identifier in common with the classification identifier of the new data item, identifying the set of training and test data packages of said two or more of the sets of training and test data packages having test data having the fewest number of data items.

2. A method as claimed in claim 1, wherein selecting said one of the plurality of sets of training and test data packages to which the new data item is added as test data comprises identifying the set of training and test data packages of the plurality having test data having the fewest number of data items having a classification identifier in common with the classification identifier of the new data item.

3. A method as claimed in claim 1, wherein selecting said one of the plurality of sets of training and test data packages to which the new data item is added as test data comprises identifying the set of training and test data packages of the plurality having test data having the fewest number of data items.

4. A method as claimed in claim 1, wherein selecting said one of the plurality of sets of training and test data packages comprises an arbitrary or random selection.

5. A method as claimed in claim 1, further comprising, for any of the first plurality of data items that is deleted from said first plurality of data items, deleting said data item from each of the plurality of sets of training and test data packages.

6. A method as claimed in claim 5, wherein in the event the first plurality of data items is modified by deleting one or more first old data items and adding one or more second new data items, the method comprising deleting said first old data item(s) from each of the plurality of sets of training and test data packages before adding the second new data item(s) to any of the plurality of sets of training and test data packages.

7. A method as claimed in claim 1, wherein the classification identifier of a data item corresponds to an intended use of said data item.

8. A method as claimed in claim 1, wherein obtaining the plurality of sets of training and test data packages comprises generating said plurality of sets of training and test data packages.

9. A method as claimed in claim 8, wherein generating each training and test data package of the plurality comprises randomly selecting said subset of test data items from the plurality of data items for each of the plurality of sets of training and test data packages, subject to defined rules.

10. A method as claimed in claim 9, wherein said defined rules require that data items are distributed amongst the test data of the plurality of sets of test and training data such that the number of data items having each classification identifier is evenly distributed amongst the plurality of sets of test and training data.

11. A method as claimed in claim 1, wherein Obtaining the plurality of sets of training and test data packages comprises receiving or retrieving said plurality of sets of training and test data packages.

12. A method as claimed in claim 1, wherein:
   the training data comprises training data for a model; and/or
   the test data comprises test data for a model.

13. A method comprising:
generating a plurality of sets of training and test data packages using a method as claimed in claim 1;
training a model using training data of a selected one of said training and test data packages; and
generating a performance measurement for the trained model by applying the test data of the selected training and test data packages to the trained model.

14. A non-transitory, computer-readable medium storing instructions that, when executed by one or more processors, cause the one or more processors to perform operations, the operations comprising:
obtaining a plurality of sets of training and test data packages, wherein: each of the plurality of sets comprises test data and training data, wherein the test data comprises a subset of a first plurality of data items and the training data comprises a remainder of the first plurality of data items; each data item of the first plurality of data items is allocated as test data for only one of the plurality of sets of training and test data packages; and each data item comprises a classification identifier;
receiving a new data item having a classification identifier; and means for adding the new data item to one of the plurality of sets of training and test data packages as test data and adding the new data item to the other of the plurality of sets of training and test data packages as training data, wherein the one of the plurality of sets of training and test data packages to which the new data item is added as test data is selected depending on the classification identifier of the new data item and the classification identifiers of the first plurality of data items, wherein selecting said one of the plurality of sets of training and test data packages to which the new data item is added as test data comprises:
identifying one or more set(s) of training and test data packages having test data having the fewest number of data items having a classification identifier in common with the classification identifier of the new data item; and
in the event that two or more of the sets of training and test data packages have test data having equal fewest data items having a classification identifier in common with the classification identifier of the new data item, identifying the set of training and test data packages of said two or more of the sets of training and test data packages having test data having the fewest number of data items.

15. An apparatus comprising:
one or more processors; and
a non-transitory, computer-readable medium storing instructions that, when executed by the one or more processors, cause the one or more processors to perform operations, the operations comprising:
obtaining a plurality of sets of training and test data packages, wherein: each of the plurality of sets comprises test data and training data, wherein the test data comprises a subset of a first plurality of data items and the training data comprises a remainder of the first plurality of data items; each data item of the first plurality of data items is allocated as test data for only one of the plurality of sets of training and test data packages; and each data item comprises a classification identifier;
receiving a new data item having a classification identifier; and means for adding the new data item to one of the plurality of sets of training and test data packages as test data and adding the new data item to the other of the plurality of sets of training and test data packages as training data, wherein the one of the plurality of sets of training and test data packages to which the new data item is added as test data is selected depending on the classification identifier of the new data item and the classification identifiers of the first plurality of data items, wherein selecting said one of the plurality of sets of training and test data packages to which the new data item is added as test data comprises:
identifying one or more set(s) of training and test data packages having test data having the fewest number of data items having a classification identifier in common with the classification identifier of the new data item; and
in the event that two or more of the sets of training and test data packages have test data having equal fewest data items having a classification identifier in common with the classification identifier of the new data item, identifying the set of training and test data packages of said two or more of the sets of training and test data packages having test data having the fewest number of data items.

* * * * *